United States Patent
Kober et al.

(10) Patent No.: US 9,995,240 B2
(45) Date of Patent: Jun. 12, 2018

(54) METHOD FOR REGULATING A COMMON-RAIL INJECTOR

(71) Applicant: Robert Bosch GmbH, Stuttgart (DE)

(72) Inventors: Ralph Kober, Schwieberdingen (DE); Holger Rapp, Ditzingen (DE); Fabian Fischer, Stuttgart (DE); Marco Beier, Leonberg (DE); Stefan Stein, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 15/123,525

(22) PCT Filed: Feb. 19, 2015

(86) PCT No.: PCT/EP2015/053463
§ 371 (c)(1),
(2) Date: Sep. 2, 2016

(87) PCT Pub. No.: WO2015/132074
PCT Pub. Date: Sep. 11, 2015

(65) Prior Publication Data
US 2017/0074203 A1    Mar. 16, 2017

(30) Foreign Application Priority Data
Mar. 6, 2014    (DE) .......................... 10 2014 204 098

(51) Int. Cl.
*F02D 41/40*    (2006.01)
*F02M 57/00*    (2006.01)
(Continued)

(52) U.S. Cl.
CPC ............. *F02D 41/40* (2013.01); *F02D 41/20* (2013.01); *F02M 51/06* (2013.01);
(Continued)

(58) Field of Classification Search
CPC .. F02D 41/40; F02D 41/20; F02D 2041/2062; F02D 2200/0612;
(Continued)

(56) References Cited

U.S. PATENT DOCUMENTS

| | | | |
|---|---|---|---|
| 6,253,736 B1 * | 7/2001 | Crofts .................. | F02M 47/027 123/467 |
| 2003/0056761 A1 * | 3/2003 | Yomogida ........... | F02D 41/3809 123/461 |

(Continued)

FOREIGN PATENT DOCUMENTS

| | | |
|---|---|---|
| DE | 10252476 A1 | 5/2004 |
| DE | 103 30 705 A1 | 1/2005 |

(Continued)

OTHER PUBLICATIONS

International Search Report dated Dec. 5, 2015 of the corresponding International Application PCT/EP2015/053463 filed Feb. 19, 2015, 3 pages.

*Primary Examiner* — Joseph Dallo
(74) *Attorney, Agent, or Firm* — Norton Rose Fulbright US LLP; Gerard Messina

(57) ABSTRACT

A method for regulating a common rail injector, the method including acquiring a signal of a sensor, which signal is proportional to a pressure in a valve space of the common rail injector; evaluating a change in the signal over time in order to detect at least one operating event of the common rail injector; and modifying at least one operating variable of the common rail injector as a function of the at least one operating event, the at least one operating variable being selected from an opening duration, a closing duration, an opening point in time, and a closing point in time of a switching valve of the common rail injector, and from an (Continued)

opening duration, an opening point in time, and a closing point in time of a needle valve of the common rail injector.

9 Claims, 2 Drawing Sheets

(51) Int. Cl.
    *F02M 51/06*      (2006.01)
    *F02M 63/00*      (2006.01)
    *F02M 47/02*      (2006.01)
    *F02D 41/38*      (2006.01)
    *F02D 41/20*      (2006.01)

(52) U.S. Cl.
    CPC ........... *F02M 57/005* (2013.01); *F02D 41/38* (2013.01); *F02D 2041/2055* (2013.01); *F02D 2041/2062* (2013.01); *F02D 2200/0602* (2013.01); *F02D 2200/063* (2013.01); *F02D 2200/0612* (2013.01); *F02D 2200/0618* (2013.01); *F02M 47/027* (2013.01); *F02M 63/0017* (2013.01); *F02M 63/0033* (2013.01); *F02M 63/0071* (2013.01); *F02M 2200/247* (2013.01); *F02M 2547/003* (2013.01); *Y02T 10/44* (2013.01)

(58) Field of Classification Search
    CPC ..... F02D 2041/2055; F02D 2200/0618; F02D 2200/0602; F02M 51/06; F02M 57/005; F02M 2200/247; F02M 63/0071; F02M 2547/003; F02M 63/0017
    See application file for complete search history.

(56) References Cited

U.S. PATENT DOCUMENTS

| | | | |
|---|---|---|---|
| 2003/0106533 A1* | 6/2003 | Crofts | F02M 47/027 123/446 |
| 2005/0235964 A1* | 10/2005 | Shibata | F02D 41/2467 123/458 |
| 2009/0020630 A1* | 1/2009 | Yan | F02M 65/003 239/533.1 |
| 2012/0325936 A1 | 12/2012 | Rodriguez-Amaya et al. | |
| 2014/0238352 A1* | 8/2014 | Methil | F02M 69/50 123/456 |
| 2016/0061137 A1* | 3/2016 | Heitz | F02D 41/248 701/103 |

FOREIGN PATENT DOCUMENTS

| | | |
|---|---|---|
| DE | 102009029549 A1 | 3/2011 |
| DE | 102011078947 A1 | 10/2012 |
| DE | 102011078159 A1 | 1/2013 |
| EP | 1321660 A2 | 6/2003 |
| WO | 2012128741 A1 | 9/2012 |

* cited by examiner

METHOD FOR REGULATING A COMMON-RAIL INJECTOR

FIELD

The present invention relates to a method for regulating a common rail injector. The present invention furthermore relates to a computer program that is configured to carry out each step of the method according to the present invention, and to a machine-readable storage medium on which the computer program according to the present invention is stored. Lastly, the present invention relates to an electronic control device that encompasses the machine-readable memory medium according to the present invention.

BACKGROUND INFORMATION

High-pressure injection systems of the common rail type encompass a pump that is embodied to pressurize liquid fuel in a specially furnished high-pressure collector (common rail) that feeds the injection apparatuses. The injection apparatus, which is referred to as a "common rail injector," has an injection opening having a needle valve that can move in the injection body between a closed position and an open position. The position of the valve needle is determined by the intensity of two forces that are generated by the action of liquid under pressure on corresponding active surfaces and that act in opposite directions. The pressurized fuel in the chamber upstream from a sealing segment of the valve needle acts in the direction lifting the valve needle off its seat, and therefore in the opening direction. An electronically controlled control valve models the pressure in a control chamber, which acts on a surface in order to generate a force that, in the idle state, is greater than the first force and acts in a closing direction of the valve needle. Activation of the valve causes a decrease in the pressure level in the control chamber down to a point at which the force that is generated by the liquid fuel, and acts in order to permit opening, predominates over the first force and causes the valve needle to rise. This results in an injection of fuel.

In common rail injectors, component tolerances and wear cause injector- and runtime-dependent effects on injection behavior. These effects must be compensated for so that the injection behavior achieved is always the same. Different fuel properties, in particular fuel type and fuel temperature, furthermore also influence injector behavior. Good compensation for these effects requires an accurate knowledge of various injector properties.

SUMMARY

An example method according to the present invention for regulating a common rail injector encompasses acquiring a signal of a sensor, which signal is proportional to a pressure in a valve space of the common rail injector. It furthermore includes evaluating a change in the signal over time in order to detect at least one operating event of the common rail injector. Lastly, it encompasses modifying at least one operating variable of the common rail injector as a function of the at least one operating event, the at least one operating variable being selected from an opening duration, a closing duration, an opening point in time, and a closing point in time of a switching valve of the common rail injector, and from an opening duration, an opening point in time, and a closing point in time of a needle valve of the common rail injector. This regulation strategy enables good compensation for effects exerted by operating events of the common rail injector on its injection behavior.

The sensor is, in particular, a piezo element disposed in the low-pressure region of the common rail injector. In this case the signal can be a voltage present at the piezo element. If the piezo element is connected via a low-impedance resistor, then instead of the voltage, the current delivered by the piezo element can be used as a signal.

The time course of the signal can be overlaid with oscillations that make it difficult to evaluate the change in the signal over time. It is therefore preferred that an oscillation overlaid on the signal be filtered before evaluation of the change in the signal.

In an example method according to the present invention, it is preferable to select as the at least one operating event an operating event that can easily be detected from the change over time in the signal, and that represents a good basis for modification of an operating variable of the common rail injector in the regulation strategy. It is therefore preferred that the at least one operating event be selected from the group consisting of a beginning of an opening of the switching valve, a force superelevation at the beginning of the opening of the switching valve, an end of the opening of the switching valve, a pressure loss in the valve space when the switching valve is open, a cavitation noise when the switching valve is open, a beginning of a closing of the switching valve, an end of the closing of the switching valve, a needle reversal of the needle valve, a pressure overshoot in the valve space in the context of the needle reversal, a valve bounce of the needle valve, a change in the pressure in the valve space during upon closing of the valve needle of the needle valve, a change in the pressure in the valve space between the open and closed switching valve states when the valve needle of the needle valve is open, and a needle closing of the needle valve.

It is preferred that at least one property of the common rail injector furthermore be ascertained by way of the evaluation of the signal. Knowledge of such an injector property enables good compensation for injector-dependent effects of the injection properties.

Particularly preferably, the at least one property of the common rail injector is selected from a degree of carbon deposition thereof, a point in time of de-throttling of its switching valve, a degree of bounce of its switching valve, and a degree of wear on its switching valve. These properties can easily be ascertained from the change over time in the signal.

It is further preferred that at least one property of a fuel that is injected by way of the common rail injector be ascertained by way of the evaluation of the signal. Fuel properties influence injector behavior, so that a knowledge thereof is advantageous in terms of always achieving identical injection behavior of the common rail injector.

Particularly preferably, the at least one property of the fuel is the viscosity thereof. The fuel viscosity depends on the type of fuel and fuel temperature, so that it is subject to changes. It furthermore has a large influence on injector behavior.

The computer program according to the present invention is configured to carry out each step of the method according to the present invention, in particular when it is carried out on an electronic control device. Preferably it is stored on a machine-readable storage medium. The computer program according to the present invention enables simple implementation of the method according to the present invention in an existing control device with no need to make physical modifications thereto. The electronic control device according to the present invention, which includes a machine-readable storage medium that stores the computer program according to the present invention, is obtained by installing the computer program according to the present invention on a conventional storage device.

BRIEF DESCRIPTION OF THE DRAWINGS

An exemplifying embodiment of the present invention is depicted in the drawings and is explained in further detail below.

DETAILED DESCRIPTION OF EXAMPLE EMBODIMENTS

Figure 1:
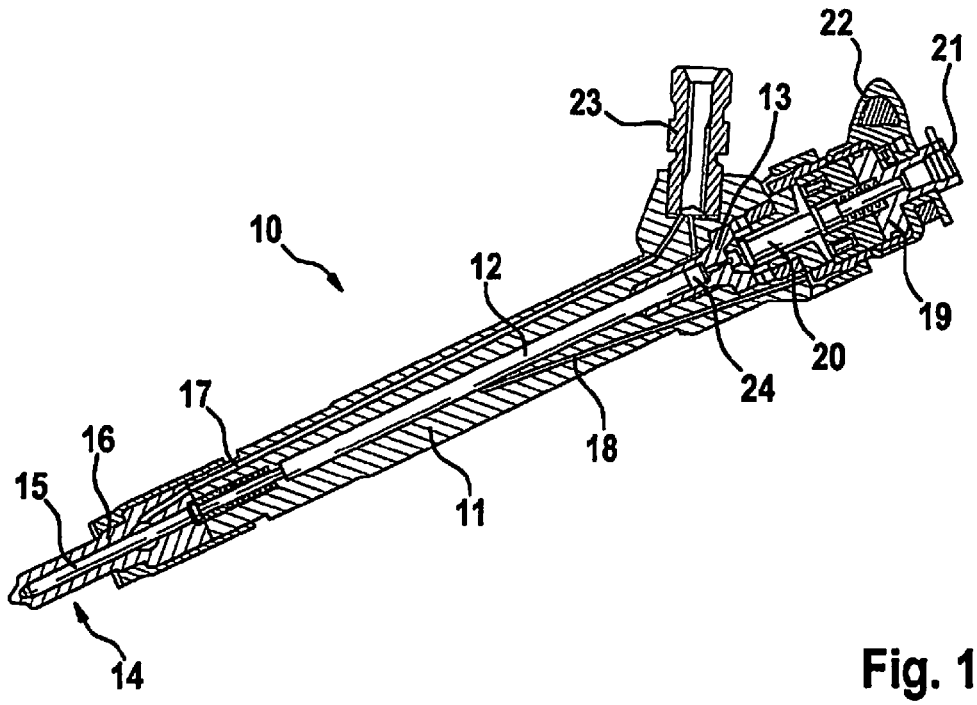
FIG. 1 is a cross-sectional depiction of a common rail injector that can be regulated by way of a method according to an exemplifying embodiment of the present invention.

An exemplifying embodiment of the present invention is described with reference to regulation of a common rail injector 10 that is described in German Patent Application No. DE 10 2009 029 549 A1 and is depicted in FIG. 1. This common rail injector 10 encompasses an injector body 11 in which a valve piston 12 is disposed. The latter is guided at an upper end in a valve piece 13. Its lower end extends toward a nozzle 14. Valve piston 12 is connected to valve needle 15 of a needle valve 16, which needle is disposed inside nozzle 14. Valve piston 12 is furthermore connected to a high-pressure orifice 17 and to a return flow orifice 18. A magnetic head 19, an armature group 20, and a return line 21 are disposed at an upper end of common rail injector 10. Common rail injector 10 is furthermore connected via an electrical connector 22 to an electrical energy source (not shown), and via a high-pressure connector 23, which encompasses a dust filter, to a fuel supply line (not shown).

In the context of the operation of common rail injector 10, provision is made that magnetic head 19 becomes energized with the result that armature group 20 is moved toward the magnetic head. This causes the connection between a control space 24 above valve piston 12, and return line 21, to open. This triggers a decrease in the pressure in control space 24, and thus an opening motion of the group made up of valve piston 12 and valve needle 15. The opening of needle valve 16 creates the connection between high-pressure orifice 17 and the spray openings of nozzle 14, with the result that fuel is delivered to nozzle 14 and is injected into a cylinder of a combustion engine.

Figure 2:
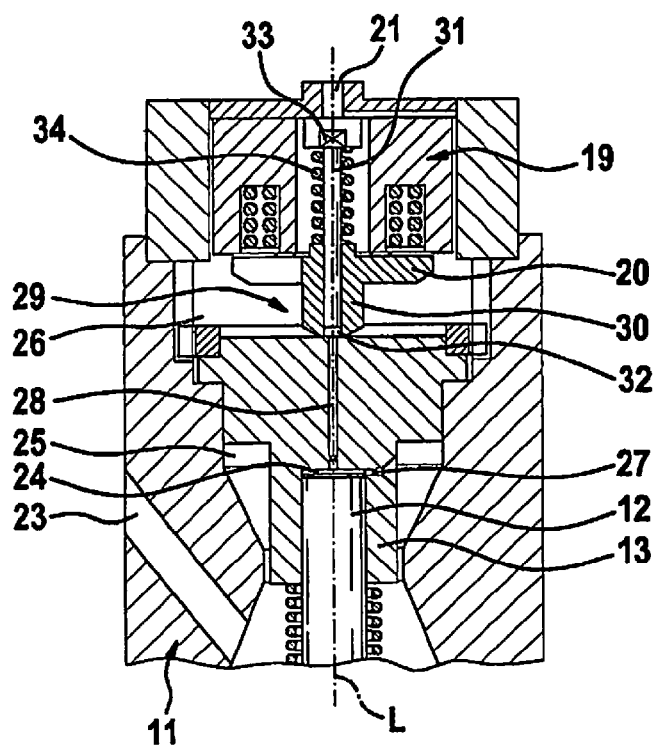
FIG. 2 shows a detail of the common rail injector according to FIG. 1.

According to FIG. 2, a high-pressure space 25 and a low-pressure space 26 are disposed inside injector body 11. These two spaces are separated from one another by valve piece 13. High-pressure space 25 communicates with high-pressure connector 23. Low-pressure space 26 is connected via return line 21 to a fuel tank. High-pressure space 25 is connected to nozzle 14. That end of valve piston 12 which is remote from the nozzle is disposed in displacement-effective fashion in control space 24 disposed in valve piece 13. Control space 24 communicates via an inflow throttle 27 with high-pressure space 25, and via a throttled outflow conduit 28 with low-pressure space 26, outflow conduit 28 being controlled by way of a switching valve 29. When outflow conduit 28 is blocked by way of switching valve 29, and when valve needle 15 is in its closed position, the same high pressure as in high-pressure space 25 is established in control space 24, with the consequence that valve piston 12 is pushed downward and valve needle 15, connected thereto, is held in the closed position that blocks needle valve 16. When outflow conduit 28 is opened by way of switching valve 29, a pressure that is decreased as compared with the high pressure in high-pressure space 25 is established in control space 24, and valve piston 12 moves in an upward direction together with valve needle 15, i.e., valve needle 15 is shifted into its open position so that fuel is injected through nozzle 14 into the combustion chamber.

Switching valve 29 possesses a sleeve-shaped closure element 30 that is loaded by a closing spring 34, which is embodied as a helical compression spring, against a seat concentric with the outlet mouth of outflow conduit 28. In the example of FIG. 2, the seat is embodied as a planar surface on which sleeve-shaped closure element 30 sits with a linear annular edge. Sleeve-shaped closure element 30 is guided axially displaceably on a guidance rod 31 equiaxial with the longitudinal axis L of injector body 11, the annular gap between the inner circumference of closure element 30 and the outer circumference of guidance rod 31 being embodied as a practically leakage-proof throttling or sealing gap. When closure element 30 is in the closed position depicted in FIG. 2, valve space 32 constituted inside closure element 30, which space communicates via outflow conduit 28 with control space 24 and then correspondingly exhibits the same fluid pressure as control space 24, is blocked off with respect to low-pressure space 26.

During the closed phase of valve needle 15 connected to valve piston 12 (i.e., when needle valve 16 is closed), switching valve 29 is closed and identical fluid pressures exist in valve space 32 and in control space 24. Immediately before the closing point in time of valve needle 15, the pressure in control space 24 drops below the high pressure in high-pressure connector 23 because of the low pressure at that point in time beneath the valve seat of valve needle 15 and because of the associated closing motion of valve piston 12. Immediately after the closing of valve needle 15, a steep rise in the pressure in control space 24 occurs because valve piston 12 is now at a standstill, and the control space pressure rises to the pressure in high-pressure connector 23. The pressure in control space 24, and the pressure (practically identical thereto) in valve space 32, consequently exhibit a pronounced minimum at the closing point in time of valve needle 15.

Because the pressure of control space 24 also exists in valve space 32 when closure element 30 is closed, in this valve position guidance rods 31 inside closure element 30 are always loaded at the end with the control space pressure. The valve space pressure is directed via guidance rod 31 to a small piezo element constituting sensor 33. Electrical terminals of sensor 33 are connected to externally accessible plug contacts, so that a voltage furnished by sensor 33 can be read out as a signal S. The latter, minus an offset voltage, is proportional to the pressure in valve space 32. The offset voltage is variable over time, but is subject only to much slower fluctuations than is the case for the pressure in valve space 32. The voltage that is read out is conveyed to a control device that controls common rail injector 10. The latter has a machine-readable data medium on which is stored a computer program that executes all steps of the method according to the present invention in accordance with the present embodiment of the present invention.

Figure 3:
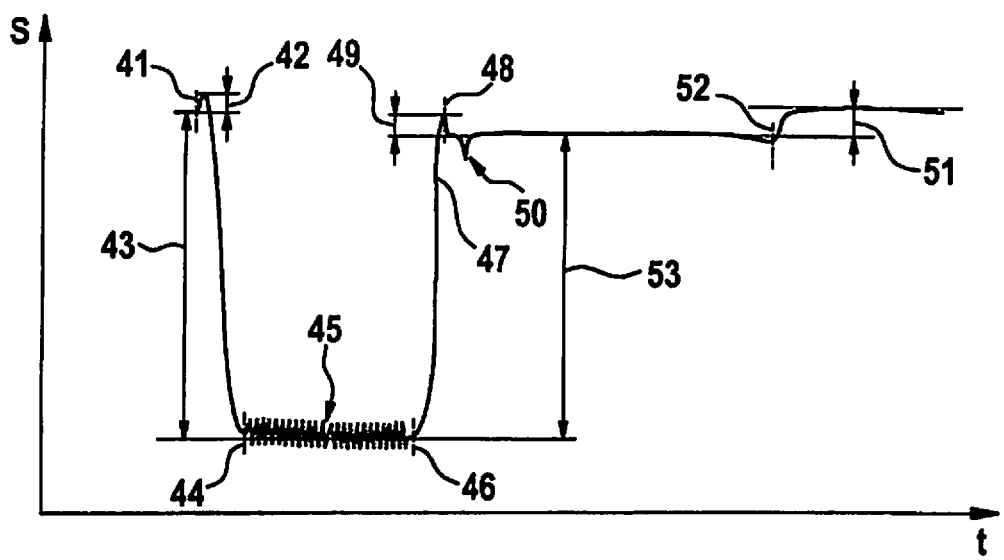
FIG. 3 is a diagram showing the time course of a signal that is evaluated in a method according to an embodiment of the invention.

In this context, an evaluation of the signal S over time t is accomplished in order to detect at least one operating event of common rail injector 10. The change in the signal S is depicted in FIG. 3. A beginning 41 of the opening of switching valve 29 is detected from a rise in the signal S proceeding from an initial value. A force superelevation 42 at the beginning of the opening of switching valve 29 is detected from the rise in the signal S from its initial value to a local maximum. A force superelevation 42 of this kind occurs because of friction between an armature and an armature pin in armature group 20. It allows an inference as to the viscosity of the fuel injected by way of common rail injector 10. An end 44 of the opening of switching valve 29 is detected from the fact that the signal S reaches a plateau-shaped local minimum. In other words, the switching valve linear travel is reached, which allows inferences as to valve spring forces, magnet forces, and interference forces of common rail injector 10. The signal difference between the initial value of the signal S and end 44 of the opening of switching valve 29 is proportional to pressure loss 43 in valve space 32 when switching valve 29 is open. The switching valve linear travel can be ascertained therefrom. While the signal S is at its local minimum, a cavitation noise 45 with switching valve 29 open can be detected. From its amplitude and frequency it is also possible to ascertain the switching valve linear travel. As soon as the signal S rises again above its local minimum, beginning 46 of closing of switching valve 29 is detected. From its point in time, the current occurring at magnetic head 19 can be calculated and a conclusion can be drawn therefrom as to the valve spring force and the magnetic force of common rail injector 10. When the slope changes in the context of this rise in the signal S, end 47 of the closing of switching valve 29 is detected. An inference therefrom as to the valve spring force of common rail injector 10 is possible. The point in time of a needle reversal 48 of needle valve 15 is detected from the point in time at which the next local maximum of the signal S is reached. The signal S then firstly drops to a local minimum and then remains at an almost constant value for a certain time period. The difference between this constant value and the local maximum is proportional to the pressure overshoot 49 in control space 24 in the context of the needle reversal. From this local minimum, a conclusion is drawn as to a valve bounce 50 of needle valve 16. Upon closing of needle valve 16, a rise in the signal S to a constant final value occurs. Needle closing 52 can be detected therefrom. The difference between the local minimum of the signal S and its final value is proportional to a change 51 in the pressure in control space 24 upon closing of valve needle 15. The pressure during the motion of valve needle 15, and thus the degree of carbon deposition of common rail injector 10, can be ascertained therefrom. This can also be done via an evaluation of difference 53 between the signal magnitude with switching valve 29 open, and with switching valve 29 closed and valve needle 15 open.

From the operating events that have been detected and from properties, derived as applicable therefrom, of common rail injector 10 and of the injected fuel, a change in at least one operating variable of common rail injector 10 is ascertained. As a result thereof, the opening duration and/or the closing duration, as well as the opening and/or closing points in time, of switching valve 29 can be adapted. The opening duration, opening point in time, and closing point in time of needle valve 16 can also be modified in this fashion.

Figure 4:
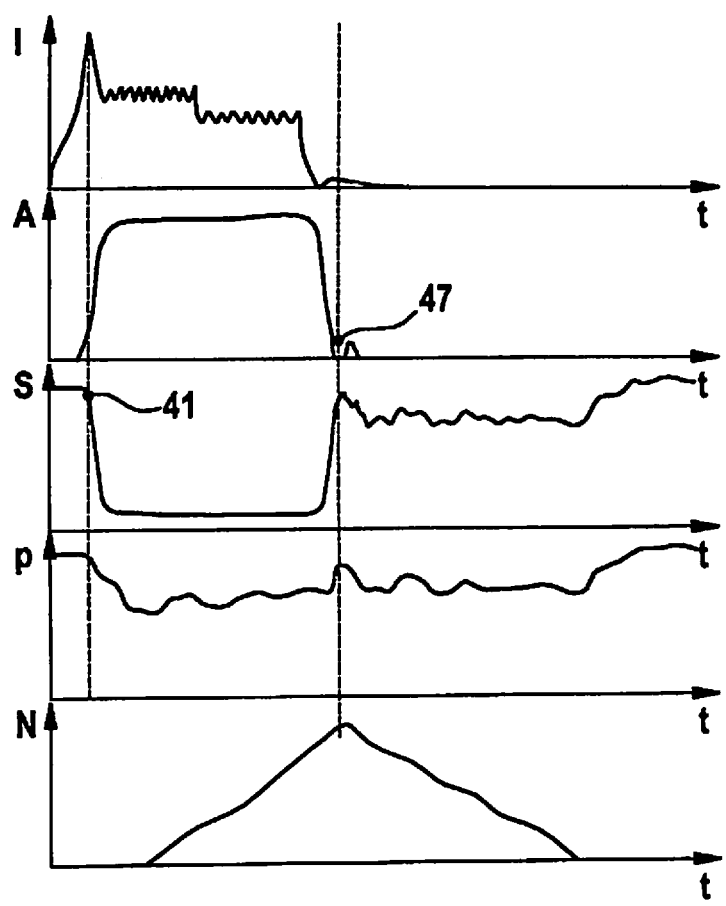
FIG. 4 shows, in five diagrams, the correlation between the time course of the signal according to FIG. 3 and the time course of current, armature linear travel, control space pressure, and needle linear travel.

In FIG. 4 the time course of the signal S is juxtaposed with the time course of the current I at magnetic head 19, of the armature linear travel A of armature group 20, of the pressure p in control space 24, and of the needle linear travel N of valve needle 15. It is evident that when switching valve 29 is closed, the profile of the signal S corresponds to the pressure p in control space 24. Between beginning 41 of the opening of switching valve 29 and end 47 of the closing of switching valve 29, the profile of the signal S differs from the profile of the pressure p in control space 24. An evaluation according to the present invention of a change in the signal S over time t thus allows the detection of more operating events of common rail injector 10 than would be possible, for example, by evaluating the pressure p in the control space.

What is claimed is:

1. A method for regulating a common rail injector, the method comprising:
    acquiring a signal of a sensor, the signal being proportional to a pressure in a valve space of the common rail injector;
    evaluating a change in the signal over time to detect at least one operating event of the common rail injector; and
    modifying at least one operating variable of the common rail injector as a function of the at least one operating event, wherein the at least one operating variable is selected from at least one of: (i) one of an opening duration, a closing duration, an opening point in time, and a closing point in time of a switching valve of the common rail injector, and from: (ii) one of an opening duration, an opening point in time, and a closing point in time of a needle valve of the common rail injector;
    wherein the sensor is disposed in a low-pressure region of the common rail injector, and
    wherein a pressure of a control space also exists in the valve space when a closure element is closed, so that in this valve position, a guidance rod inside the closure element is loaded at the end with a pressure of the control space, so that a valve space pressure is directed via the guidance rod to the sensor.

2. The method as recited in claim 1, wherein an oscillation overlaid on the signal is filtered before evaluation of the change in the signal.

3. The method as recited in claim 1, wherein the at least one operating event is selected from the group consisting of: a beginning of an opening of the switching valve, a force superelevation at the beginning of the opening of the switching valve, an end of the opening of the switching valve, a pressure loss in the valve space when the switching valve is open, a beginning of a closing of the switching valve, an end of the closing of the switching valve, a needle reversal of the needle valve, a pressure overshoot in the valve space in the context of the needle reversal, a valve bounce of the needle valve, a change in the pressure in the valve space upon closing of the valve needle of the needle valve, a change in the pressure in the valve space between the open and closed switching valve states when the valve needle of the needle valve is open, and a needle closing of the needle valve.

4. The method as recited in claim 1, wherein at least one property of the common rail injector is ascertained by the evaluation of the signal.

5. The method as recited in claim 4, wherein the at least one property of the common rail injector is selected from: a degree of carbon deposition thereof, a point in time of de-throttling of a switching valve of the common rail injector, a degree of bounce of the switching valve, and a degree of wear on the switching valve.

6. The method as recited in claim 1, wherein at least one property of a fuel that is injected by the common rail injector is ascertained by the evaluation of the signal.

7. The method as recited in claim 6, wherein the at least one property of the fuel is the viscosity thereof.

8. A non-transitory machine-readable storage medium having a computer program, which is executable by a processor, comprising:
   a program code arrangement having program code for regulating a common rail injector, by performing the following:
      acquiring a signal of a sensor, the signal being proportional to a pressure in a valve space of the common rail injector;
      evaluating a change in the signal over time to detect at least one operating event of the common rail injector; and
      modifying at least one operating variable of the common rail injector as a function of the at least one operating event, wherein the at least one operating variable is selected from at least one of: (i) one of: an opening duration, a closing duration, an opening point in time, and a closing point in time of a switching valve of the common rail injector, and from: (ii) one of an opening duration, an opening point in time, and a closing point in time of a needle valve of the common rail injector;
      wherein the sensor is disposed in a low-pressure region of the common rail injector, and
      wherein a pressure of a control space also exists in the valve space when a closure element is closed, so that in this valve position, a guidance rod inside the closure element is loaded at the end with a pressure of the control space, so that a valve space pressure is directed via the guidance rod to the sensor.

9. An electronic control device for regulating a common rail injector, comprising:
   an electronic control unit configured to perform the following:
      acquiring a signal of a sensor, the signal being proportional to a pressure in a valve space of the common rail injector;
      evaluating a change in the signal over time to detect at least one operating event of the common rail injector; and
      modifying at least one operating variable of the common rail injector as a function of the at least one operating event, wherein the at least one operating variable is selected from at least one of: (i) one of: an opening duration, a closing duration, an opening point in time, and a closing point in time of a switching valve of the common rail injector, and from: (ii) one of an opening duration, an opening point in time, and a closing point in time of a needle valve of the common rail injector;
   wherein the sensor is disposed in a low-pressure region of the common rail injector, and
   wherein a pressure of a control space also exists in the valve space when a closure element is closed, so that in this valve position, a guidance rod inside the closure element is loaded at the end with a pressure of the control space, so that a valve space pressure is directed via the guidance rod to the sensor.

* * * * *